United States Patent
Huber et al.

(10) Patent No.: US 10,778,058 B2
(45) Date of Patent: *Sep. 15, 2020

(54) SOLID INSULATION MATERIAL

(71) Applicant: Siemens Aktiengesellschaft, Munich (DE)

(72) Inventors: Jürgen Huber, Erlangen (DE); Dieter Schirm, Breitengüßbach (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/083,341

(22) PCT Filed: Feb. 8, 2017

(86) PCT No.: PCT/EP2017/052721
§ 371 (c)(1),
(2) Date: Sep. 7, 2018

(87) PCT Pub. No.: WO2017/153113
PCT Pub. Date: Sep. 14, 2017

(65) Prior Publication Data
US 2019/0089217 A1  Mar. 21, 2019

(30) Foreign Application Priority Data
Mar. 9, 2016 (DE) .................. 10 2016 203 867

(51) Int. Cl.
H01B 3/04 (2006.01)
H01B 3/40 (2006.01)
H02K 15/10 (2006.01)
H02K 15/12 (2006.01)
H02K 3/30 (2006.01)
H02K 3/40 (2006.01)
C09J 7/21 (2018.01)
C09J 7/30 (2018.01)
B32B 3/26 (2006.01)
B32B 7/12 (2006.01)
H02K 3/34 (2006.01)
C08G 59/18 (2006.01)
B32B 5/02 (2006.01)
B32B 5/06 (2006.01)
B32B 5/24 (2006.01)
H01B 3/00 (2006.01)
H01B 3/48 (2006.01)
(Continued)

(52) U.S. Cl.
CPC .............. *H02K 3/30* (2013.01); *B32B 3/266* (2013.01); *B32B 7/12* (2013.01); *C09J 7/21* (2018.01); *C09J 7/30* (2018.01); *H01B 3/04* (2013.01); *H01B 3/40* (2013.01); *H02K 3/34* (2013.01); *H02K 3/40* (2013.01); *H02K 15/105* (2013.01); *H02K 15/12* (2013.01); *B32B 5/02* (2013.01); *B32B 5/06* (2013.01); *B32B 5/24* (2013.01); *B32B 2260/02* (2013.01); *B32B 2260/021* (2013.01); *B32B 2260/046* (2013.01); *B32B 2307/206* (2013.01); *B32B 2307/304* (2013.01); *B32B 2315/10* (2013.01); *B32B 2457/04* (2013.01); *C08G 59/184* (2013.01); *C09J 2203/326* (2013.01); *C09J 2400/12* (2013.01); *C09J 2400/143* (2013.01); *C09J 2400/283* (2013.01); *C09J 2463/00* (2013.01); *H01B 3/002* (2013.01); *H01B 3/008* (2013.01); *H01B 3/307* (2013.01); *H01B 3/48* (2013.01); *H01B 3/50* (2013.01); *H01B 7/02* (2013.01)

(58) Field of Classification Search
None
See application file for complete search history.

(56) References Cited

U.S. PATENT DOCUMENTS 3,647,611 A  3/1972 Mertens .................. 428/324
3,663,513 A * 5/1972 Kazama ................. C08G 18/10
528/59
(Continued)

FOREIGN PATENT DOCUMENTS

CA  2135566 A1 * 6/1995 ........... B29C 70/025
CH  696992 A5 * 2/2008 ............... H01B 3/04
(Continued)

OTHER PUBLICATIONS

Three Bond, Curing Agents for Epoxy Resin, Dec. 1990 (Year: 1990).*

(Continued)

Primary Examiner — Jeffrey A Vonch
(74) Attorney, Agent, or Firm — Slayden Grubert Beard PLLC

(57) ABSTRACT

Various embodiments may include a solid insulation material, e.g. in tape form, the use thereof in a vacuum impregnation process, and/or an insulation system produced therewith and also an electrical machine having the insulation system, for the medium- and high-voltage sector. Some examples include rotating electrical machines in the medium- and high-voltage sector and also semifinished products for electrical switchgear. The solid insulation material and the insulation system produced therewith are characterized in that it can be produced in an anhydride-free manner, wherein the curing catalyst is, for example, an adduct of a 1H-imidazole and/or 1H-imidazole derivative with a compound containing oxirane groups.

20 Claims, No Drawings

(51) Int. Cl.
  *H01B 3/30* (2006.01)
  *H01B 7/02* (2006.01)
  *H01B 3/50* (2006.01)

(56) References Cited

U.S. PATENT DOCUMENTS

| | | | | |
|---|---|---|---|---|
| 3,756,984 | A * | 9/1973 | Klaren | C07D 231/12 528/94 |
| 4,336,302 | A * | 6/1982 | Ihlein | C08G 59/68 428/324 |
| 4,487,914 | A * | 12/1984 | Barton | C08G 59/64 525/504 |
| 4,528,358 | A | 7/1985 | Kleeberg et al. | 528/94 |
| 4,587,311 | A * | 5/1986 | Schmid | C08G 59/44 525/504 |
| 4,737,553 | A * | 4/1988 | Gannon | C08G 59/066 525/481 |
| 4,845,172 | A * | 7/1989 | Brytus | C08G 59/04 525/481 |
| 4,923,910 | A * | 5/1990 | Kitagawa | C08G 59/184 523/428 |
| 5,001,212 | A * | 3/1991 | Hammer | C08G 59/5093 528/361 |
| 5,006,611 | A * | 4/1991 | Schmid | C08G 59/32 525/423 |
| 5,032,453 | A * | 7/1991 | Rogler | C08L 63/10 428/324 |
| 5,077,355 | A * | 12/1991 | Nagase | C08G 59/182 525/484 |
| 5,077,376 | A * | 12/1991 | Dooley | C08G 59/182 252/182.28 |
| 5,155,182 | A * | 10/1992 | Burba | C07D 231/12 252/182.26 |
| 5,158,826 | A * | 10/1992 | Ihlein | C08G 59/24 428/324 |
| 5,175,219 | A * | 12/1992 | Burba | C07D 231/12 427/386 |
| 5,310,864 | A * | 5/1994 | Wintraecken | C08G 59/184 528/361 |
| 5,357,008 | A * | 10/1994 | Tsai | C08G 59/184 525/504 |
| 5,393,805 | A * | 2/1995 | Koyama | C08G 59/18 428/413 |
| 5,464,949 | A | 11/1995 | Markovitz et al. | 174/120 R |
| 5,608,016 | A * | 3/1997 | Gras | C07C 63/313 525/420 |
| 5,674,340 | A * | 10/1997 | Swiatkowski | B32B 19/00 156/184 |
| 5,717,011 | A * | 2/1998 | Griggs | C08G 59/184 523/414 |
| 5,733,954 | A * | 3/1998 | McKenzie | C08G 59/184 523/414 |
| 5,789,498 | A * | 8/1998 | Ohnishi | C07D 233/56 525/526 |
| 6,040,396 | A * | 3/2000 | Gan | C08G 59/182 525/502 |
| 6,218,483 | B1 * | 4/2001 | Muthiah | C08G 59/18 525/113 |
| 6,492,437 | B1 * | 12/2002 | Musa | C08G 59/184 523/456 |
| 2005/0222381 | A1 | 10/2005 | Groppel | 528/491 |
| 2007/0252449 | A1 * | 11/2007 | Ikeda | H01B 3/40 310/45 |
| 2008/0233300 | A1 * | 9/2008 | Cinoman | C09D 133/068 427/386 |
| 2008/0251757 | A1 * | 10/2008 | Yamamoto | C08G 18/7831 252/73 |
| 2009/0023843 | A1 * | 1/2009 | Beisele | C08L 63/00 524/99 |
| 2009/0076180 | A1 * | 3/2009 | Iwaya | C08L 63/00 522/31 |
| 2010/0130655 | A1 * | 5/2010 | Agarwal | C09J 163/00 524/145 |
| 2011/0028602 | A1 * | 2/2011 | Gan | C08G 59/686 523/429 |
| 2011/0040046 | A1 * | 2/2011 | Hefner, Jr. | C08G 59/182 525/533 |
| 2011/0092643 | A1 * | 4/2011 | Frijns | C08G 18/44 524/612 |
| 2011/0287679 | A1 | 11/2011 | Swiatkowski | 442/164 |
| 2012/0010328 | A1 | 1/2012 | Swiatkowski | 523/427 |
| 2012/0038239 | A1 * | 2/2012 | Ikeda | H02K 3/30 310/215 |
| 2013/0144015 | A1 * | 6/2013 | Hefner | C08G 59/184 525/524 |
| 2013/0196161 | A1 * | 8/2013 | Kang | H01B 3/006 428/414 |
| 2013/0244022 | A1 | 9/2013 | Rueger et al. | 428/324 |
| 2014/0138008 | A1 | 5/2014 | Gröppel et al. | 156/53 |
| 2015/0340920 | A1 * | 11/2015 | Ikeda | H02K 3/40 310/45 |

FOREIGN PATENT DOCUMENTS

| | | | | |
|---|---|---|---|---|
| CN | 1062545 | A | 7/1992 | C08F 267/10 |
| CN | 102942682 | A * | 2/2013 | H01B 3/04 |
| CN | 102964534 | A * | 3/2013 | B29C 70/025 |
| DE | 1273647 | B * | 7/1968 | H01B 3/04 |
| DE | 3327712 | A1 | 2/1985 | B32B 27/12 |
| DE | 3733789 | A1 | 4/1989 | C08G 59/22 |
| DE | 8905612 | U1 * | 6/1989 | H01B 3/04 |
| DE | 19820216 | A1 | 11/1999 | C08G 59/32 |
| DE | 19857697 | A1 | 6/2000 | C08K 5/353 |
| DE | 10208743 | A1 | 12/2003 | C08G 59/00 |
| DE | 102013226705 | A1 | 6/2015 | C08G 59/18 |
| DE | 102014216437 | A1 | 2/2016 | C08K 5/092 |
| EP | 0024119 | A1 * | 2/1981 | C07D 249/08 |
| EP | 0355558 | A1 | 2/1990 | C08L 63/10 |
| EP | 0660336 | A2 | 6/1995 | B29C 70/02 |
| GB | 1014895 | A * | 12/1965 | C08L 67/06 |
| GB | 1208718 | A * | 10/1970 | H01B 3/04 |
| JP | 07149928 | A * | 6/1995 | H01B 3/04 |
| JP | 2010193673 | A * | 9/2010 | C07D 249/08 |
| JP | 2013181124 | A * | 9/2013 | |
| JP | 2014505121 | A | 2/2014 | C09D 201/00 |
| RU | 2499006 | C2 | 11/2013 | C08G 59/42 |
| RU | 2523282 | C2 | 7/2014 | C08G 59/04 |
| SU | 878081 | A1 | 12/1983 | H01B 3/04 |
| WO | 90/00802 | A1 | 1/1990 | C07D 233/61 |
| WO | 2017/153113 | A1 | 9/2017 | C08G 59/18 |

OTHER PUBLICATIONS

Machine Translation of CH 696992 A5, Feb. 2008 (Year: 2008).*
Machine Translation of CN 102964534 A, Mar. 2013 (Year: 2013).*
Epotek, Pot Life, Working Life and Gel Time of Epoxies, Jan. 2014 (Year: 2014).*
Canada Colors and Chemicals Limited, "Material Safety Data Sheet," Momentive, URL: URL:http://doc.ccc-group.com/msds/english/406783.pdf, 11 pages, Dec. 18, 2012.
German Office Action, Application No. 102016203867.2, 8 pages, dated Aug. 1, 2016.
International Search Report and Written Opinion, Application No. PCT/EP2017/052721, 16 pages, dated May 15, 2017.
Russian Office Action, Application No. 2018132040/04, 15 pages, dated Jun. 27, 2019.
Chinese Office Action, Application No. 201780016081.6, 18 pages, dated May 28, 2019.
Japanese Office Action, Application No. 2018547434, 13 pages, dated Nov. 5, 2019.
Indian Office Action, Application No. 201817028506, 6 pages, dated Feb. 10, 2020.

* cited by examiner

SOLID INSULATION MATERIAL

CROSS-REFERENCE TO RELATED APPLICATIONS

This application is a U.S. National Stage Application of International Application No. PCT/EP2017/052721 filed Feb. 8, 2017, which designates the United States of America, and claims priority to DE Application No. 10 2016 203 867.2 filed Mar. 9, 2016, the contents of which are hereby incorporated by reference in their entirety.

TECHNICAL FIELD

The present disclosure relates to insulation. Various embodiments may include a solid insulation material, especially in tape form, the use thereof in a vacuum impregnation process, and/or an insulation system produced therewith and also an electrical machine having the insulation system, especially for the medium- and high-voltage sector, namely for medium- and high-voltage machines, especially rotating electrical machines in the medium- and high-voltage sector and also semifinished products for electrical switchgear.

BACKGROUND

Electrical machines (motors, generators) typically have, in the majority of the longitudinal grooves of their stator laminate stacks, special types of coil windings or conductor bars, generally made from copper or another material of high conductivity. In the case of an electric motor, by supplying current in a time-selective manner, a magnetic field propagating in all directions is generated, and this drives the freely rotating rotor suspended in the stator cavity, and the rotor reacts to the induced magnetic field in the form of forced rotation, for example owing to a multitude of applied permanent magnets, and hence converts electrical energy to kinetic energy. In electrical terms, the laminate stack is at ground potential, but the coils are at high kilovolt potential. The coils fitted into the stator grooves must accordingly be electrically insulated with respect to ground potential. For this purpose, each and every coil is insulated, for example, with a special tape, for example mica tape, repeatedly and with defined overlap.

Mica is commonly used since, being a particulate inorganic barrier material, especially in platelet form, it is capable of retarding electrical erosion under electrical partial discharges effectively and for a long period, for example over the entire lifetime of the machine, and has good chemical and thermal stability. Mica tapes consist of mica paper and one or more carriers, for example fabrics, film(s), bonded to one another via a tape adhesive. Mica tapes are necessary since mica paper alone does not have the mechanical strength needed for an insulation process. According to the application, additives may be added to the tape adhesive, for example curing catalysts, which have an initiating effect on the thermal curing of an externally applied impregnating agent: after the mica tape-insulated coils have been fitted into the stator laminate stacks and electrically connected, for avoidance of partial discharges during later operation, the air in the cavities of the windings and especially in the groove gaps of the stator laminate stack is eliminated. Since this distance from current-carrying insulated coil to the laminate stack is generally kept as small as possible, field strengths of several kV/mm there are not unusual. There is corresponding stress on the insulation material.

Impregnating agents according to the prior art that have been found to be suitable for vacuum impregnation processes are thermally curable epoxy resin/anhydride mixtures. They are used for impregnation of the stators of the electrical machines, composed of the individual parts thereof, with the fitted and mica tape-insulated coils, or for individual coil or conductor bar impregnation. During a VPI (vacuum pressure impregnation) process, these stators or coils are usually wholly flooded with a mobile epoxy resin/phthalic anhydride formulation in a vacuum chamber and then impregnated under pressure. The final curing is generally effected under standard pressure in an industrial oven.

The function of the curing catalyst is for the mobile impregnating agent, usually composed of epoxy resin and phthalic anhydride, to gelate within a particular period at a given temperature. The industrial standard impregnating agent in this regard has to date been a mixture of distilled bisphenol A diglycidyl ether and methylhexahydrophthalic anhydride. This mixture is sufficiently mobile to assure the complete impregnation of the tape insulation on the one hand and, in the absence of curing catalysts, sufficient storage stability on the other hand. The curing catalyst is generally at least also present in the solid insulation material, for example mica tape. This mica tape is held together by the tape adhesive, and so it is essential that the tape adhesive and the curing catalyst are inert to one another.

Typically, all three components, i.e. tape adhesive, curing catalyst, and charged impregnating agent, do not react until the moment they encounter one another during the VPI process. In this way, the best possible crosslinking and attachment, compatibility and freedom of the insulation from cavities are achieved, which leads in turn to an optimized lifetime of the "main insulation" of the electrical machine formed thereafter in the course of curing. Owing to toxicological concerns about the unrestricted use of phthalic anhydrides, impregnating agents used in the future will be phthalic anhydride-free or completely anhydride-free epoxy-based impregnating agents, which are polymerized using curing catalysts.

The novel curing catalysts are matched to the anhydride-free impregnating agents. There is increasing use of anhydride-free impregnating agents, as known from the prior applications DE 102015214872.6 and DE 102015213534.9, the disclosure content of which is hereby incorporated into the present description. These propose the use on the one hand of imidazoles and/or pyrazoles and the derivatives thereof as curing catalysts, and on the other hand covalently bridged diimidazole derivatives and/or covalently bridged dipyrazole derivatives as curing catalysts which, for example, are condensation products and/or addition products. These are curing catalysts in solid insulating materials which, by virtue of the molecular enlargement and possible additional interactions at the formerly electrophilic center, have a lower volatility than the simple (alkyl)imidazoles. In spite of this lower volatility, the reactivity with respect to acid anhydride-free impregnating resins based on epoxy resin is adversely affected only insubstantially, or not at all, in comparison to simple (alkyl)imidazoles. Consequently, these systems represent excellent curing catalysts for acid anhydride-free impregnating resins based on epoxy resin.

SUMMARY

There is still a requirement for novel curing catalysts for anhydride-free glycidyl ether epoxy resins and glycidyl ester epoxy resins, especially for those which can be produced from readily-available raw materials in a manner suitable for mass production, and/or which have better chemical compatibility with epoxy resins than the imidazoles, diimidazoles, pyrazoles, and/or dipyrazoles known from the prior art. The teachings of the present disclosure may be embodied in a solid insulation material with a curing catalyst, which overcomes the disadvantages of the prior art, with the use of the organic acid anhydrides and/or the phthalic anhydrides which sensitize the respiratory pathway generally being avoided.

For example, some embodiments may include a solid insulation material which can be used together with an anhydride-free impregnating agent for the preparation of an insulation system in a vacuum impregnation process, wherein said solid insulation material comprises a carrier, a barrier material, a curing catalyst and a tape adhesive, the curing catalyst and the tape adhesive being inert to one another but, under the conditions of the vacuum impregnation, reacting with an anhydride-free impregnating agent with gelling times of 1 h to 15 h at the impregnation temperature, the curing catalyst being obtainable by reaction of at least one 1H-imidazole and/or 1H-imidazole derivative with a compound containing oxirane groups.

In some embodiments, the compound containing oxirane groups has n=1 to 4 oxirane functionalities per molecule.

In some embodiments, the compound containing oxirane groups is a glycidyl compound.

In some embodiments, the compound containing oxirane groups is liquid at room temperature.

In some embodiments, the curing catalyst is a compound which is an adduct of one and/or more 1H-acid dinitrogen heterocycles and/or 1H-acid trinitrogen heterocycles with a compound containing oxirane groups.

In some embodiments, the compound containing oxirane groups is a compound selected from the following group of compounds:
monoglycidyl ether and/or ester compound (n=1), diglycidyl ether and/or ester compound (n=2), triglycidyl ether and/or ester compound (n=3) and/or tetraglycidyl ether and/or ester compound (n=4), and also any desired mixtures of the present compounds.

In some embodiments, the curing catalyst has a nitrogen density D in the range from, for example, 1 to 15 mmol/g.

In some embodiments, the curing catalyst is an adduct of a
1H-2-methylimidazole (CAS no. 693-98-1),
1H-2-ethylimidazole (CAS no. 1072-62-4),
1H-4-ethyl-2-phenylimidazole,
1H-3,5-dimethylpyrazole,
1H-imidazole (CAS no. 288-32-4),
1H-4(5)-methylimidazole (CAS no. 822-36-6),
1H-2-ethyl-4-methylimidazole (CAS no. 931-36-2),
1H-4-methyl-2-phenylimidazole (CAS no. 827-43-0),
1H-4-phenylimidazole (CAS no. 670-95-1),
1H-5-methyl-2-phenylimidazole-4-methanol (CAS no. 13682-32-1),
1H-pyrazole (CAS no. 288-13-1),
1H-3-phenylpyrazole (CAS no. 2458-26-6),
1H-5-methylpyrazole,
1H-3,4-dimethylpyrazole (CAS no. 2820-37-3),
1H-3,5-dimethylpyrazole (CAS no. 67-51-6),
1H-3-tert-butylpyrazole (CAS no. 15802-80-9) and/or
1H-4-ethylpyrazole (CAS no. 17072-38-7)
and also any desired mixtures of the abovementioned compounds with a compound containing oxirane groups.

In some embodiments, the curing catalyst additionally has n=1-4 covalently bonded hydroxyl groups per molecule.

In some embodiments, the tape adhesive comprises an addition product of a bisphenol, diol, triol and/or higher alcohol, subsequently referred to as "$A(OH)_n$" segment, with cyclohexene oxide and/or a cyclohexene oxide derivative, subsequently referred to as "Cy" segment, wherein $A(OH)_n$ is selected from the following group of compounds:
monoethylene glycol $(C_2H_4)(OH)_2$, butanediols $(C_4H_8)(OH)_2$, butenediols $(C_4H_6)(OH)_2$, butynediol $(C_4H_4)(OH)_2$, polyethylene glycols $H(OC_2H_4)_x(OH)_2$ with x=1 to 5000, propylene glycol $(C_3H_6)(OH)_2$, polypropylene glycols $H(OC_3H_6)_x(OH)_2$ with x=1 to 5000, diethylene glycol $(C_2H_8O)(OH)_2$, propanediols $(O_3H_6)(OH)_2$, neopentyl glycol $(C_5H_{10})$ $(OH)_2$, cyclopentanediols $(C_5H_8)$ $(OH)_2$, cyclopentenediols $(C_5H_6)(OH)_2$, glycerol $(C_3H_5)$ $(OH)_3$, pentanediols $(C_5H_{10})(OH)_2$, pentaerythritol $(C_5H_8)$ $(OH)_4$, hexanediols $(C_6H_{12})$ $(OH)_2$, hexylene glycols $(C_6H_{12})$ $(OH)_2$, heptanediols $(C_7H_{14})$ $(OH)_2$, octanediols $(C_8H_{16})(OH)_2$, polycaprolactone diols, polycaprolactone triols, hydroquinone $(O_6H_4)$ $(OH)_2$, resorcinol $(C_6H_4)$ $(OH)_2$, (gyro) catechol $(C_6H_4)(OH)_2$, rucinol $(C_{10}H_{12})(OH)_2$, triethylene glycol $(C_6H_{12})$ $(OH)_2$
fully aromatic, partially hydrogenated and/or fully hydrogenated bisphenol A $(C_{15}H_{14})(OH)_2$, $(C_{15}H_{28})(OH)_2$, bisphenol F $(C_{13}H_{10})$ $(OH)_2$, bisphenol S $(C_{12}H_8O_2S)$ $(OH)_2$
tricyclodecane dimethanol $(C_{12}H_{18})(OH)_2$, glycerol carbonate $(C_4H_5)$ $(OH)_1$.

In some embodiments, the tape adhesive comprises a compound selected from the following group of compounds:
tricyclomethane dimethanol (CAS no. 26896-48-0 or 26160-83-8),
trimethylolpropane (CAS no. 77-99-6),
dendritic, hydroxy-functional polymers (CAS no. 326794-48-3 or 462113-22-Q),
polycaprolactone triols (CAS no. 37625-56-2),
polycaprolactone tetrols (CAS no. 35484-93-6).

In some embodiments, the curing catalyst is present in an amount of less than 10 wt %.

In some embodiments, the tape adhesive is present in an amount in the range from 1 to 30 wt %.

In some embodiments, there is a carrier in the form of a woven material, nonwoven material and/or film.

In some embodiments, there is a perforated film.

In some embodiments, there is a particulate barrier material.

In some embodiments, the particulate barrier material comprises at least partially platelet-shaped barrier material particles.

In some embodiments, the particles of the barrier material are coated.

In some embodiments, the coating comprises a metal oxide.

In some embodiments, the coating is doped.

As another example, some embodiments include the use of an insulation system, produced by vacuum impregnation with a solid insulation material as described above, in medium- and high-voltage machines, especially rotating electrical machines in the medium- and high-voltage sector, and also in electrical switchgear, medium- and high-voltage applications, bushings, transformer bushings, generator bushings and/or HVDC bushings, and in corresponding semifinished products.

As another example, some embodiments include an electrical machine, e.g., rotating electrical machine in the medium- and high-voltage sector and electrical switchgear, medium- and high-voltage application, bushing, transformer bushing, generator bushing and/or HVDC bushing, and corresponding semifinished product, comprising an insulation system produced from a solid insulation material as described above.

DETAILED DESCRIPTION

Some embodiments of the teachings herein may include a solid insulation material which can be used together with an anhydride-free impregnating agent for the preparation of an insulation system in a vacuum impregnation process, wherein said solid insulation material comprises a carrier, a barrier material, a curing catalyst and a tape adhesive, the curing catalyst and the tape adhesive being inert to one another but, under the conditions of the vacuum impregnation, reacting with an anhydride-free impregnating agent with gelling times of 1 h to 15 h at the impregnation temperature, the curing catalyst being obtainable by reaction of at least one 1H-imidazole and/or 1H-imidazole derivative with a compound containing oxirane groups. Some embodiments may include the use of the insulation system produced in this way in electrical machines, e.g., in rotating electrical machines in the medium- and high-voltage sector, and also in electrical switchgear, medium- and high-voltage applications, bushings, transformer bushings, generator bushings and/or HVDC bushings, and in corresponding semifinished products. Finally, electrical machines in the medium- and high-voltage sector and electrical switchgear, medium- and high-voltage applications, bushings, transformer bushings, generator bushings and/or HVDC bushings, and corresponding semifinished products, may include such an insulation system.

Although the curing catalyst can be obtained by reaction at least of a 1H-imidazole and/or 1H-imidazole derivative with a compound containing oxirane groups, it can also be produced according to other desired synthesis routes. The curing catalyst is for example merely the adduct of a 1H-imidazole and/or 1H-imidazole derivative with a compound containing oxirane groups. In some embodiments, the curing catalyst, which is for example an adduct of a 1H-imidazole and/or 1H-imidazole derivative with a compound containing oxirane groups, has a nitrogen density D in the range from, for example, 1 to 15 mmol/g; D is especially in the range from $1 \cdot 10^{-3}$ mol/g<D<$13 \cdot 10^{-3}$ mol/g, from $2.5 \ast 10^{-3}$ mol/g to $10 \ast 10^{-3}$ mol/g and from $4.5 \cdot 10^{-3}$ mol/g to $9 \cdot 10^{-3}$ mol/g. The molar nitrogen density D, that is mass-specific and capable of polymerization, given here is defined by the unit $10^{-3}$ mol/g (corresponding to a thousandth of a mole per gram), which gives the content of nitrogen atoms with non-aromatic and concurrently non-bonding electron pairs per molecule. For example, the nitrogen density of the following compound, which discloses a curing catalyst according to the prior art,

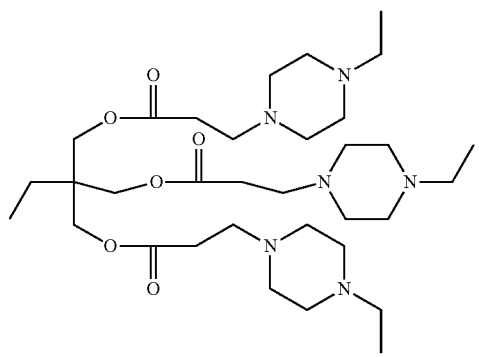 [SMILES: CCN1CCN(CCC(=O)OCC(CC)(COC(=O)CCN2CCN(CC)CC2)COC(=O)CCN2CCN(CC)CC2)CC1]

Structure I: Conventional curing catalyst according to the prior art can be determined as follows: the molar mass of the molecule depicted, which represents a conventional curing catalyst according to the prior art, is M=638.89 g/mol. It has 3 nitrogen electron pairs capable of polymerization and hence for example the reference nitrogen density of 3 mol/638.89 g=$4.7 \cdot 10^{-3}$=1/g.

In some embodiments, a curing catalyst is an adduct of a 1H-imidazole and/or 1H-imidazole derivative with a compound containing oxirane groups. It is possible to produce a curing catalyst in mica papers containing binder which can be modified such that it becomes vacuum-stable at temperatures from 50-80° C. For example, such a curing catalyst has a vapor pressure of less than $10^{-4}$ mbar at 70° C., and also a suitable dynamic viscosity.

In some embodiments, the curing catalyst exhibits a dynamic viscosity in the range from 1 to 10 000 Pa·s, especially from 5 to 5000 Pa·s, or in the range from 10 to 3000 Pa·s.

In some embodiments, the curing catalyst exhibits a vapor pressure at the impregnation temperature of less than $10^{-1}$ mbar, especially at 70° C. in the range from $10^{-2}$ mbar to $10^{-8}$ mbar, from $10^{-3}$ mbar to $10^{-7}$ mbar, or from $10^{-4}$ mbar to $10^{-6}$ mbar.

A curing catalyst can be obtained by reaction at least of a 1H-imidazole and/or 1H-imidazole derivative with a compound containing oxirane groups, such as obtained via an addition reaction, as represented schematically below:

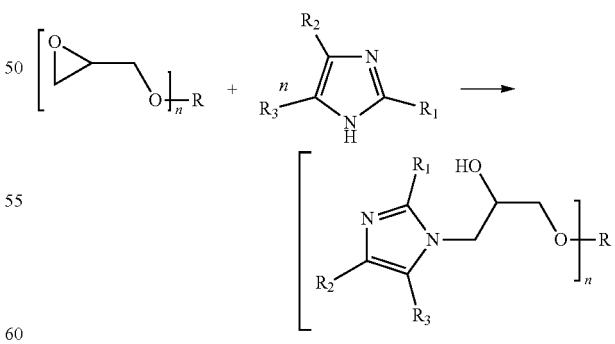

Reaction Equation I: Imidazole Derivative Addition Reaction

Wherein, n=1-4; $R_1$, $R_2$, $R_3$=hydrogen, alkyl and/or aryl; R is the molecular radical of the compound containing oxirane groups, i.e. for example a glycidyl reactant compound.

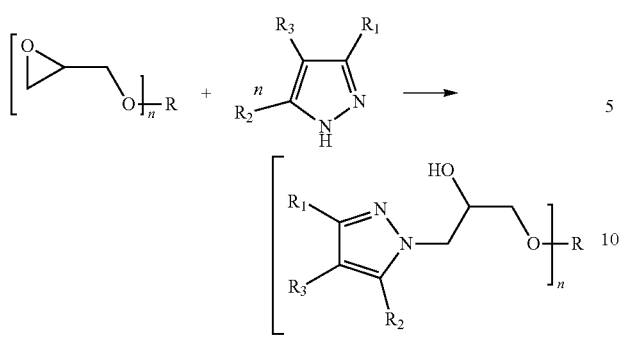

Reaction equation II: Pyrazole derivative addition reaction wherein, n=1-4; $R_1$, $R_2$, $R_3$=hydrogen, alkyl and/or aryl; R is the molecular radical of the compound containing oxirane groups, i.e. for example the glycidyl reactant compound.

The table below shows a summary of possible reactants for preparing the curing catalyst, for example according to one of the mechanisms shown in the reaction equations I and/or II. The rows in the table give exemplary reactants containing oxirane groups and the columns give exemplary 1H-imidazole and/or 1H-imidazole derivatives: In particular, the abbreviations used in the columns have the following meanings:

Im: 1H-imidazole;
2m-Im: 1H-2-methylimidazole;
2e-Im: 1H-2-ethylimidazole;
2e-4m-Im: 1H-2-ethyl-4-methylimidazole;
4e-2Ph-Im: 1H-4-ethyl-2-phenylimidazole, and
3,5m-Pyr: 1H-3,5-dimethylpyrazole.

The numerical values given correspond in each case to the nitrogen density D of the curing catalyst, i.e. of the respective addition product, as described above. As compounds containing oxirane groups, for example glycidyl ether and/or glycidyl ester compounds are used. Exemplary compounds are listed in the following table, with ester derivatives and/or other derivatives of the compounds containing oxirane groups mentioned by way of example here that are obvious to those skilled in the art in all cases also being incorporated within.

TABLE 1

Examples of reactants used for preparing the curing catalyst

| Reactant compound | CAS no. Reactant | N density D in [$10^{-3}$ mol/g] product, when using | | | | | |
|---|---|---|---|---|---|---|---|
| | | Im | 2m-Im | 2e-Im | 2e-4m-Im | 4m-2Ph-Im | 3,5m-Pyr |
| 2-Ethylhexyl glycidyl ether | 2461-15-6 | 3.93 | 3.73 | 3.54 | 3.37 | 2.90 | 3.54 |
| Allyl glycidyl ether | 106-92-3 | 7.99 | 7.19 | 6.53 | 5.98 | 4.65 | 6.53 |
| Glycidyl isopropyl ether | 4016-14-2 | 5.43 | 5.04 | 4.71 | 4.42 | 3.64 | 4.71 |
| Glycidyl methyl ether | 64491-70-9 | 6.40 | 5.88 | 5.43 | 5.04 | 4.06 | 5.43 |
| Ethyl glycidyl ether | 4016-11-9 | 5.88 | 5.43 | 5.04 | 4.71 | 3.84 | 5.04 |
| Benzyl glycidyl ether | 2930-05-4 | 4.31 | 4.06 | 3.84 | 3.64 | 3.10 | 3.84 |
| tert.-Butyl glycidyl ether | 7665-72-7 | | | | | | |
| n-Butyl glycidyl ether | 2426-08-6 | 5.04 | 4.71 | 4.42 | 4.16 | 3.47 | 4.42 |
| Glycidyl-2-methylphenyl ether | 2210-79-9 | 4.31 | 4.06 | 3.84 | 3.64 | 3.10 | 3.84 |
| Furfuryl glycidyl ether | 5380-87-0 | 4.50 | 4.23 | 4.00 | 3.78 | 3.20 | 4.00 |
| tert.-Butyldimethylsilylglycidyl ether | 124150-87-4 | 3.90 | 3.70 | 3.52 | 3.35 | 2.89 | 3.52 |
| 2-Biphenyl1 glycidyl ether | 7144-65-2 | 3.40 | 3.24 | 3.10 | 2.97 | 2.60 | 3.10 |
| Bisphenol A-(2,3-dihydroxypropyhglycidyl ether | 76002-91-0 | 2.34 | 2.27 | 2.20 | 2.13 | 1.94 | 2.20 |
| n-Octyl glycidyl ether | 68609-96-1 | 3.93 | 3.73 | 3.54 | 3.37 | 2.90 | 3.54 |
| n-Decyl glycidyl ether | | 3.54 | 3.37 | 3.22 | 3.08 | 2.69 | 3.22 |
| Glycidyl propargyl ether | 18180-30-8 | 5.55 | 5.15 | 4.80 | 4.50 | 3.70 | 4.80 |
| Glycidyl-4-methoxyphenyl ether | 2211-94-1 | 4.03 | 3.81 | 3.62 | 3.44 | 2.96 | 3.62 |
| Glycidyl-4-nonylphenyl ether | 6178-32-1 | 2.90 | 2.79 | 2.68 | 2.59 | 2.30 | 2.68 |
| Glycidyl hexadecyl ether | 15965-99-8 | 2.73 | 2.63 | 2.53 | 2.45 | 2.19 | 2.53 |
| Glycidyl trityl ether | 65291-30-7, 129940-50-7 | 2.60 | 2.51 | 2.42 | 2.34 | 2.11 | 2.42 |
| Dodecyl glycidyl ether | 68609-97-2 | 3.22 | 3.08 | 2.95 | 2.84 | 2.50 | 2.95 |
| Tetradecyl ether | | 2.95 | 2.84 | 2.73 | 2.63 | 2.33 | 2.73 |
| Phenyl glycidyl ether | 122-60-1, 71031-02-2, 71031-03-3 | 4.58 | 4.31 | 4.06 | 3.84 | 3.24 | 4.06 |
| Poly(ethylene glycol)diglycidyl ether (Mw~500) | 72207-80-8 | 3.14 | 3.01 | 2.89 | 2.78 | 2.45 | 2.89 |
| Glycidyl methacrylate | 106-91-2 | 7.19 | 6.53 | 5.98 | 5.52 | 4.36 | 5.98 |
| Resorcinol diglycidyl ether | 101-90-6 | 5.58 | 5.18 | 4.83 | 4.52 | 3.71 | 4.83 |
| Diethylene glycol diglycidyl ether | 4206-61-5 | 5.64 | 5.23 | 4.87 | 4.56 | 3.74 | 4.87 |
| Glycidyl butyrate | 60456-26-0, 65031-96-1 | 4.71 | 4.42 | 4.16 | 3.93 | 3.31 | 4.16 |
| Glycidyl acrylate | 106-90-1 | 7.57 | 6.84 | 6.24 | 5.74 | 4.50 | 6.24 |
| Glycidol | 556-52-5 | 7.03 | 6.40 | 5.88 | 5.43 | 4.31 | 5.88 |
| Neopentylglycol diglycidyl ether | 17557-23-2 | 5.67 | 5.26 | 4.90 | 4.58 | 3.75 | 4.90 |
| Diglycidyl ether | 2238-07-5 | 7.51 | 6.79 | 6.20 | 5.71 | 4.48 | 6.20 |
| Bisphenol A diglycidyl ether | 1675-54-3 | 4.20 | 3.96 | 3.75 | 3.57 | 3.05 | 3.75 |
| Glycerol diglycidyl ether | 27043-36-3 | 5.88 | 5.43 | 5.04 | 4.71 | 3.84 | 5.04 |
| 1,2-Propanediol diglycidyl ether | 16096-30-3 | 6.17 | 5.68 | 5.26 | 4.90 | 3.96 | 5.26 |
| 1,4-Butanediol diglycidyl ether | 2425-79-8 | 5.91 | 5.46 | 5.07 | 4.73 | 3.86 | 5.07 |
| 1,4-Cyclohexanedimethanol diglycidyl ether | 14228-73-0 | 5.10 | 4.76 | 4.46 | 4.20 | 3.49 | 4.46 |

TABLE 1-continued

Examples of reactants used for preparing the curing catalyst

| Reactant compound | CAS no. Reactant | N density D in $[10^{-3}$ mol/g] product, when using | | | | | |
|---|---|---|---|---|---|---|---|
| | | Im | 2m-Im | 2e-Im | 2e-4m-Im | 4m-2Ph-Im | 3,5m-Pyr |
| Bisphenol F diglycidyl ether | 2095-03-6 | 4.46 | 4.20 | 3.96 | 3.75 | 3.18 | 3.96 |
| Poly(propylene glycol)diglycidyl ether (Mw~380) | 26142-30-3 | 3.87 | 3.68 | 3.49 | 3.33 | 2.87 | 3.49 |
| Trimethylolpropane triglycidyl ether | 3454-29-3 | 5.92 | 5.47 | 5.08 | 4.74 | 3.86 | 5.08 |
| Tris(4-hydroxyphenyl)methane triglycidyl ether | 66072-38-6 | 4.51 | 4.24 | 4.01 | 3.79 | 3.21 | 4.01 |
| Trimethylolethane triglycidyl ether | 68460-21-9 | 6.09 | 5.61 | 5.20 | 4.85 | 3.93 | 5.20 |
| Tris(2,3-epoxypropyhisocyanurate | 2451-62-9 | 5.98 | 5.52 | 5.12 | 4.78 | 3.89 | 5.12 |
| Triglycidyl-para-aminophenol triglycidyl-meta-aminophenol | 28768-32-3 | 6.23 | 5.73 | 5.30 | 4.94 | 3.99 | 5.30 |
| Pentaerythritol tetraglycidyl ether | 3126-63-4 | 6.32 | 5.81 | 5.37 | 4.99 | 4.03 | 5.37 |
| Tetraglycidyl-4,4'-diaminodiphenylmethane | 28768-32-3 | 5.76 | 5.33 | 4.96 | 4.63 | 3.79 | 4.96 |
| 3,4-Epoxycyclohexylmethyl-3',4'-epoxycyclohexanecarboxylate | 2386-87-0 | 5.15 | 4.80 | 4.50 | 4.23 | 3.52 | 4.50 |

Tris-(1H-2-methylimidazole)reactant

Technical grade trimethylolpropane triglycidyl ether in 5% molar deficiency relative to the 1H-imidazole derivative were added slowly dropwise by means of a dropping funnel, with stirring, into a three-necked flask with reflux condenser in which 5 g of 1H-2-methylimidazole had been initially charged in 20 ml toluene at room temperature and had been dissolved under reflux for 10 min at 130° C.

The mixture was then refluxed for a few hours. Subsequently, an orange-colored, clear, highly viscous liquid was able to be obtained, which was dried under vacuum at 50-100° C.

A 5% (w/w) admixture to distilled Bisphenol A diglycidyl ether at 70° C. gave gelation and anionic curing. The same procedure was carried out with trimethylolpropane triglycidyl ether-tris(1H-2-ethyl-4-methylimidazole) reactant, neopentyl diglycidyl ether-bis(1H-2-ethyl-4-methylimidazole) reactant and bisphenol F diglycidyl ether-bis(1H-2-methylimidazole) reactant, with the distilled bisphenol F diglycidyl ether also being predissolved in toluene.

As tape adhesive, in the presence of the abovementioned reactants 1H-imidazole and/or 1H-imidazole derivatives with compounds containing oxirane groups as curing catalyst, use is preferably made of a tape adhesive as described in DE 102015205328.8, the disclosure content of which is hereby incorporated into the subject matter of the present description. Furthermore, for example a compound selected from the following group may be used in the solid insulation material:
tricyclomethane dimethanol (CAS no. 26896-48-0 or 26160-83-8),
trimethylolpropane (CAS no. 77-99-6),
dendritic, hydroxy-functional polymers (CAS no. 326794-48-3 or 462113-22-0),
polycaprolactone triols (CAS no. 37625-56-2), and/or
polycaprolactone tetrols (CAS no. 35484-93-6).

The tape adhesive connects the at least one carrier and the barrier material in the solid insulation material. It is present in the solid insulation material in an amount in the range from 1 to 30 wt %, 2 to 15 wt %, or 5 to 10 wt %. The carrier in the solid insulation material is in the form of a woven material, such as glass fiber woven material, or a nonwoven material, especially a polyester nonwoven, paper and/or film. The carrier may also be in the form of a perforated film.

In some embodiments, the particulate barrier material is located at, in and/or on this carrier in the solid insulation material. The barrier material may be at least partially in platelet form. Mica can especially be used as barrier material. In some embodiments, a coated particulate barrier material is used. This can especially be a metal oxide-coated particulate barrier material, for example tin oxide, zinc oxide or titanium oxide-coated particles.

In some embodiments, a doped coating of the particulate, especially platelet-shaped barrier material is provided. The tape adhesive connects the at least one carrier and the barrier material in the solid insulation material. It is present in the solid insulation material in an amount in the range from 1 to 30 wt %, 2 to 15 wt %, or 5 to 10 wt %.

In some embodiments, the curing catalyst, also referred to as "tape curing catalyst" or "tape accelerator" is present in the solid insulation material in a concentration of less than 10 wt %, for example from 0.001 wt % to 7.5 wt %, in the range from 0.01 wt % to 5 wt %, or from 0.1 wt % to 3.5 wt %, such that gelling times of several hours can be produced.

In some embodiments, the curing catalyst initiates the polymerization of the impregnation resin at temperatures in the range from 20° C. to 100° C., from 50° C. to 80° C., or from 55° C. to 75° C.

In order to achieve the targeted storage stability in the solid insulation material, for example at room temperature and especially for several hours of continuously maintained vacuum and impregnation temperature, the curing catalyst is comparatively inert to the tape adhesive material. This is especially also the case under the conditions of maintained vacuum and/or impregnation temperature, which are for example in the range between 20° C. and 100° C., between 50° C. to 80° C., or between 55° C. to 75° C. Suitable as tape adhesive are, for example, diols, triols and/or polyols.

What is claimed is:

1. An insulation system prepared in a vacuum impregnation process, the insulation system comprising:
   an anhydride-free impregnating agent; and
   a solid insulation material comprising:
      a carrier;
      a barrier material;
      a curing catalyst; and
      a tape adhesive;
   wherein the curing catalyst and the tape adhesive are inert to one another at standard atmospheric conditions, but react with one another in the presence of the impregnating agent at a pressure and a temperature associated with the vacuum impregnation process and gel in a time between 1 to 15 hours, wherein the temperature is between 20 degrees Celsius and 100 degrees Celsius; and the curing catalyst comprises a product of a reaction of a 1H-imidazole and/or 1H-imidazole derivative with a compound containing oxirane groups with 1 to 4 oxirane functionalities per molecule.

2. The insulation system as claimed in claim 1, wherein the compound containing oxirane groups has 4 oxirane functionalities per molecule.

3. The insulation system as claimed in claim 1, wherein the compound containing oxirane groups comprises a glycidyl compound.

4. The insulation system as claimed in claim 1, wherein the compound containing oxirane groups is liquid at room temperature.

5. The insulation system as claimed in claim 1, wherein the curing catalyst comprises an adduct of one or more 1H-acid dinitrogen heterocycles and/or 1H-acid trinitrogen heterocycles with a compound containing oxirane groups.

6. The insulation system as claimed in claim 1, wherein the compound containing oxirane groups is a compound selected from the following group of compounds:
monoglycidyl ether and/or ester compound (n=1),
diglycidyl ether and/or ester compound (n=2),
triglycidyl ether and/or ester compound (n=3),
tetraglycidyl ether and/or ester compound (n=4), and
mixtures thereof.

7. The insulation system as claimed in claim 1, wherein the curing catalyst has a nitrogen density D in a range from 1 to 15 mmol/g.

8. The insulation system as claimed in claim 1, wherein the curing catalyst comprises a compound containing oxirane groups and an adduct of at least one of the following:
1H-2-methylimidazole (CAS no. 693-98-1),
1H-2-ethylimidazole (CAS no. 1072-62-4),
1H-4-ethyl-2-phenylimidazole,
1H-3,5-dimethylpyrazole,
1H-imidazole (CAS no. 288-32-4),
1H-4(5)-methylimidazole (CAS no. 822-36-6),
1H-2-ethyl-4-methylimidazole (CAS no. 931-36-2),
1H-4-methyl-2-phenylimidazole (CAS no. 827-43-0),
1H-4-phenylimidazole (CAS no. 670-95-1),
1H-5-methyl-2-phenylimidazole-4-methanol (CAS no. 13682-32-1),
1H-pyrazole (CAS no. 288-13-1),
1H-3-phenylpyrazole (CAS no. 2458-26-6),
1H-5-methylpyrazole,
1H-3,4-dimethylpyrazole (CAS no. 2820-37-3),
1H-3,5-dimethylpyrazole (CAS no. 67-51-6),
1H-3-tert-butylpyrazole (CAS no. 15802-80-9), and/or
1H-4-ethylpyrazole (CAS no. 17072-38-7).

9. The insulation system as claimed in claim 1, wherein the curing catalyst comprises 1-4 covalently bonded hydroxyl groups per molecule.

10. The insulation system as claimed in claim 1, wherein the tape adhesive comprises an addition product of a bisphenol, diol, triol, and/or higher alcohol (A(OH)n), with a cyclohexene oxide and/or a cyclohexene oxide derivative (Cy), wherein A(OH)n comprises at least one compound selected from the following group of compounds:
monoethylene glycol (C2H4)(OH)2, butanediols (C4H8)(OH)2, butenediols (C4H6)(OH)2, butynediol (C4H4)(OH)2, polyethylene glycols H(OC2H4)x(OH)2 with x=1 to 5000, propylene glycol (C3H6)(OH)2, polypropylene glycols H(OC3H6)x(OH)2 with x=1 to 5000, diethylene glycol (C2H8O)(OH)2, propanediols (C3H6)(OH)2, neopentyl glycol (C5H10)(OH)2, cyclopentanediols (C5H8)(OH)2, cyclopentenediols (C5H6)(OH)2, glycerol (C3H5)(OH)3, pentanediols (C5H10)(OH)2, pentaerythritol (C5H8)(OH)4, hexanediols (C6H12)(OH)2, hexylene glycols (C6H12)(OH)2, heptanediols (C7H14)(OH)2, octanediols (C8H16)(OH)2, polycaprolactone diols, polycaprolactone triols, hydroquinone (C6H4)(OH)2, resorcinol (C6H4)(OH)2, (pyro)catechol (C6H4)(OH)2, rucinol (C10H12)(OH)2, triethylene glycol (C6H12)(OH)2, fully aromatic, partially hydrogenated and/or fully hydrogenated bisphenol A (C15H14)(OH)2, (C15H28)(OH)2, bisphenol F (C13H10)(OH)2, bisphenol S (C12H8O2S)(OH)2, tricyclodecane dimethanol (C12H18)(OH)2, and glycerol carbonate (C4H5)(OH)1.

11. The insulation system as claimed in claim 1, wherein the tape adhesive comprises a compound selected from the following group of compounds:
tricyclodecane dimethanol (CAS no. 26896-48-0 or 26160-83-8),
trimethylolpropane (CAS no. 77-99-6),
dendritic, hydroxy-functional polymers
(CAS no. 326794-48-3 or 462113-22-0),
polycaprolactone triols (CAS no. 37625-56-2), and
polycaprolactone tetrols (CAS no. 35484-93-6).

12. The insulation system as claimed in claim 1, wherein the curing catalyst is less than 10 wt % of the solid insulation material.

13. The insulation system as claimed in claim 1, wherein the tape adhesive is within a range of 1 to 30 wt % of the solid insulation material.

14. The insulation system material as claimed in claim 1, wherein the carrier comprises a film, a woven material, and/or a nonwoven material.

15. The insulation system as claimed in claim 1, wherein the carrier comprises a perforated film.

16. The insulation system as claimed in claim 1, further comprising a particulate barrier material.

17. The insulation system as claimed in claim 1, wherein the particulate barrier material comprises platelet-shaped barrier material particles.

18. The insulation system as claimed in claim 16, wherein the particles of the barrier material include a coating.

19. The insulation system as claimed in claim 18, wherein the coating comprises a metal oxide.

20. The insulation system as claimed in claim 18, wherein the coating comprises doping.

* * * * *